June 30, 1931.  M. RALL ET AL  1,812,552

GEARING

Filed Sept. 21, 1928

Inventors
Max Rall
Ernst Durst
By Steward & McKay
their attorneys

Patented June 30, 1931

1,812,552

UNITED STATES PATENT OFFICE

MAX RALL AND ERNST DURST, OF STUTTGART, GERMANY, ASSIGNORS TO ROBERT BOSCH AKTIENGESELLSCHAFT, OF STUTTGART, GERMANY

GEARING

Application filed September 21, 1928, Serial No. 307,497, and in Germany October 17, 1927.

This invention relates to improvements in toothed gearing and more particularly to high speed gearing.

It is well known that considerable vibration and shock often occur in high speed gears which are set up by inaccuracies in the gear wheels themselves or by inaccuracies in their mounting. The result is noisy running of the gears, heavy wear and even damage.

In order to avoid this objection, it has already been proposed to provide an intermediate pinion and to give this a spring mounting. This method of mounting is objectionable and there is practically always the danger of the springs breaking. According to another proposal the bearings are spaced away from one of the gear wheels to such an extent that the elasticity of the shaft of this wheel allows of its free adjustment. This arrangement, which is also very objectionable, occupies considerable space and necessitates a long shaft which causes difficulty in design in view of the strains upon it.

A very simple solution of the problem is obtained according to the invention in that an intermediate gear wheel of the gearing is freely mounted on a support such as a pin so as to be capable of universal movement.

One form of construction of the invention is shown in the drawings, in which:—

Figure 1:
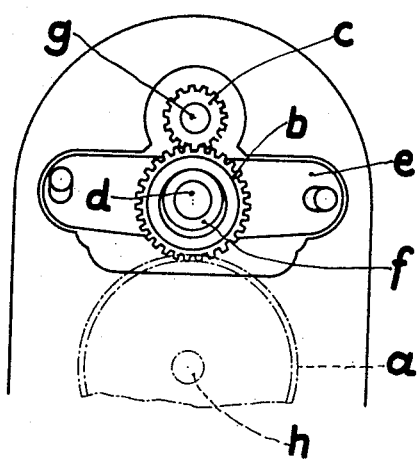
Figure 1 is a plan view of a gearing and intermediate gear wheel.
Figure 2:
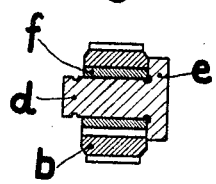
Figure 2 is a vertical section through the intermediate gear and its mounting.

The gearing consists of three pinions $a$, $b$, $c$, the pinion $a$ only being indicated by dotted lines. The mounting pin $d$ for the intermediate pinion $b$ is located on a bearing plate $e$ which, for the purpose of adjustment of the intermediate pinion relative to the remaining gears, is adjustable in both longitudinal and transverse directions in known manner.

The pinion $b$ is freely mounted on the pin $d$, by the diameter of the bore being slightly greater than the diameter of the pin. It can therefore give in all directions and can adapt itself to any inaccuracies in the gear, similarly as a spring-mounted gear wheel in the arrangement mentioned above.

It is preferable not to mount the pinion $b$ directly on the pin, as this can easily be worn away by the high friction at high velocities of revolution. A bush $f$ preferably of non-metallic material, e. g. of bakelized cotton such as is known in the trade under the names Turbax, Resitex, Novotext is therefore arranged between the pinion $b$ and the pin $d$. In this case the bush $f$ has more or less the ordinary seating on the pin $d$ whilst the pinion $b$ has appreciably greater play on the bush. The interposition of the bush yields the advantage that the friction is distributed over a plurality of running faces, as the pinion and bush rotate about the pin $d$ in the same direction with different velocities.

The invention is particularly applicable in electrical magnetos to the drive of the shaft $g$ of the dynamo from the shaft $h$ of the magneto. Of course, the bush can also have an ordinary seating on the pin and a play in the pinion.

We claim:

1. A set of gears including a pair of gear wheels, one pinion only having a hole therethrough interposed between and in mesh with said wheels, a pin located within the hole in said pinion and of diameter smaller than the diameter of the hole, a plate supporting said pin, and means for adjusting said plate in a plane perpendicular to the axis of the pin.

2. A set of gears including a pair of gear wheels, a pinion having a hole therethrough interposed between and in mesh with said wheels, a pin located within said hole and a bush of non-metallic, bakelized fibrous material rotatably mounted on said pin, the external diameter of said bush being smaller than the internal diameter of the hole in the pinion whilst its internal diameter is substantially equal to the diameter of the pin.

3. A set of gears including a pair of gear wheels, a pinion having a hole therethrough interposed between and in mesh with said wheels, a pin located within said hole, a plate supporting said pin, means for adjusting said plate in a plane perpendicular to the axis of the pin and a bush rotatably mounted on said pin, the external diameter of said bush being smaller than the internal diameter of the hole in the pinion whilst its internal diameter is substantially equal to the diameter of the pin.

In testimony whereof we have hereunto affixed our signatures.

MAX RALL.
ERNST DURST.